(12) United States Patent
Daniel

(10) Patent No.: US 10,343,195 B2
(45) Date of Patent: Jul. 9, 2019

(54) SYSTEMS AND METHODS FOR MONITORING AND OPTIMIZING FLARE PURGE GAS WITH A WIRELESS ROTAMETER

(71) Applicant: Saudi Arabian Oil Company, Dhahran (SA)

(72) Inventor: Selvam Daniel, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 388 days.

(21) Appl. No.: 15/185,212

(22) Filed: Jun. 17, 2016

(65) Prior Publication Data
US 2017/0361363 A1 Dec. 21, 2017

(51) Int. Cl.
| | |
|---|---|
| *F23G 7/08* | (2006.01) |
| *F23G 5/50* | (2006.01) |
| *B08B 9/032* | (2006.01) |
| *G01F 1/22* | (2006.01) |
| *G01F 1/24* | (2006.01) |
| *G01F 15/00* | (2006.01) |
| *G01F 15/04* | (2006.01) |
| *G01F 15/06* | (2006.01) |

(52) U.S. Cl.
CPC ............ *B08B 9/0325* (2013.01); *F23G 5/50* (2013.01); *F23G 7/08* (2013.01); *F23G 7/085* (2013.01); *G01F 1/22* (2013.01); *G01F 1/24* (2013.01); *G01F 15/001* (2013.01); *G01F 15/04* (2013.01); *G01F 15/061* (2013.01)

(58) Field of Classification Search
CPC .................................. F23D 13/20; G01F 1/22
USPC .................................................. 431/3, 5, 29
See application file for complete search history.

(56) References Cited

U.S. PATENT DOCUMENTS

| | | | |
|---|---|---|---|
| 4,634,369 A | 1/1987 | McGill et al. | |
| 5,425,316 A * | 6/1995 | Malone | F23G 5/006 110/190 |
| 5,440,217 A * | 8/1995 | Traina | G01F 1/002 318/51 |

(Continued)

FOREIGN PATENT DOCUMENTS

| | | |
|---|---|---|
| CN | 201017446 | 2/2008 |
| CN | 201163205 Y | 12/2008 |
| CN | 102393230 A | 3/2012 |

OTHER PUBLICATIONS

International Search Report and Written Opinion for related PCT application PCT/US2017/037906 dated Sep. 7, 2017.

(Continued)

*Primary Examiner* — Gregory L Huson
*Assistant Examiner* — Nikhil P Mashruwala
(74) *Attorney, Agent, or Firm* — Bracewell LLP; Constance G. Rhebergen; Linda L. Morgan

(57) ABSTRACT

A method for optimizing purge gas of a flare system includes measuring a flow of flare fluids within a flare system to obtain a measured flow value. The flow of the flare fluids is compared to a target flow to obtain a difference between the flow of the flare fluids and the target flow. A control valve is operated to amend a flow of purge gas and the steps of measuring a flow of flare fluids and comparing the flow of the flare fluids to the target flow are repeated until the flow of the purge gas is within a target range. A value of the flow of purge gas is measured and transmitted wirelessly to a control system.

20 Claims, 3 Drawing Sheets

(56) References Cited

U.S. PATENT DOCUMENTS

| | | | |
|---|---|---|---|
| 5,504,693 A | 4/1996 | Elliott et al. | |
| 6,012,917 A * | 1/2000 | Wiseman | F23C 5/02 |
| | | | 431/154 |
| 7,342,079 B2 * | 3/2008 | Sher | C08F 6/003 |
| | | | 526/206 |
| 7,376,521 B2 | 5/2008 | James et al. | |
| 7,725,270 B2 | 5/2010 | Davis | |
| 7,896,645 B2 * | 3/2011 | Loving | F23C 3/002 |
| | | | 110/210 |
| 7,974,741 B2 | 7/2011 | Watson | |
| 8,096,803 B2 * | 1/2012 | Mashhour | F23L 17/16 |
| | | | 110/344 |
| 8,342,018 B2 | 1/2013 | Huang et al. | |
| 8,629,313 B2 * | 1/2014 | Hong | F23G 5/50 |
| | | | 431/5 |
| 8,812,162 B2 * | 8/2014 | Schneider | F23B 90/08 |
| | | | 700/274 |
| 8,878,690 B2 | 11/2014 | Olson et al. | |
| 9,482,568 B2 * | 11/2016 | Quist | G01F 15/00 |
| 9,958,302 B2 * | 5/2018 | Mudd | F16K 37/005 |
| 2004/0261673 A1 * | 12/2004 | Allen | F23N 5/082 |
| | | | 110/342 |
| 2009/0309028 A1 * | 12/2009 | Venkoparao | G01J 5/0014 |
| | | | 250/338.5 |
| 2015/0015308 A1 * | 1/2015 | Da Dalt | H03L 7/093 |
| | | | 327/106 |
| 2015/0211649 A1 | 7/2015 | King | |
| 2016/0091355 A1 | 3/2016 | Mesnard et al. | |
| 2017/0191350 A1 * | 7/2017 | Johns | E21B 43/26 |

OTHER PUBLICATIONS

Hemalatha, et al., Design and Development of Wireless Flow Transmitter; ICEEOT; Vellor, India; Mar. 2016.

* cited by examiner

SYSTEMS AND METHODS FOR MONITORING AND OPTIMIZING FLARE PURGE GAS WITH A WIRELESS ROTAMETER

BACKGROUND OF THE DISCLOSURE

1. Field of the Disclosure

The disclosure relates generally to flow meter monitoring and control assemblies and more specifically to the optimization of purge gas systems with a wireless rotameter.

2. Description of the Related Art

In oil refineries and in other oil and gas processing plants, relief devices that can emit hydrocarbons are connected to a flare or vent network. The flare or vent network ends up in a flare or vent stack which continuously emits the hydrocarbons to atmosphere. A vent stack does not burn the hydrocarbons and simply disposes them to the atmosphere at a safe location. Hence gas flow emitted by a vent stack is typically small. When the gas flows to be continuously disposed are quite high, the gas needs to be combusted before disposing it to the atmosphere. This consumption is achieved in a flare stack. The hydrocarbons are continuously combusted at the flare stack tip before disposing to atmosphere.

If the flow of gas to vent or flare stack stops for some reason, there is a possibility of air ingress into the flare stack and into the vent knockout drum and other regions of the vent network. This can result in an explosive mixture of air and hydrocarbons in the vent or flare network, which can be catastrophic. If air enters the flare stack, a release of process gas could result in a combustible mixture present within the flare in a restricted zone. The ignition of this air and gas mixture can result in an explosion and cause severe equipment damage. In addition, oxygen concentrations in the stack exceeding approximately 6% could allow the ingress of the flame front.

One of the ways to avoid air ingress into the flare stack, vent knockout drum, flare network and subsequent catastrophic consequences, is to continuously purge a small flow rate of hydrocarbon gases. Purge gas (or purge flow) is used to prevent air impingement in the process header where there is little or no process flow going to the flare (as in the case of a dedicated intermittent or emergency shut down flare). This continuous hydrocarbon gas purge flow in the flare network helps to build up some positive backpressure at the vent knock out drum. This continuous purge gas flow maintains a small positive backpressure in the vent knockout drum and vent header and helps to keep the air out. It is important for the source of the continuous purge gas flow to be located at the farthest end of the flare or vent network from the flare stack. This way the constant positive back pressure can be felt throughout the flare network, at all the relieving sources.

In gas plants, the total flared quantity can include the total volume due to valve leaks, purge fuel gas, relieved gas, and any other flows of gas. In some current systems, the purging flow to the flare is measured by local, variable area flow meters, which are of analog type, field readable and independent from any other system. Such local meters can be checked by a field operator on a weekly basis, and with a metallic pointer, can be difficult to accurately read, short term variations in flow can be misread or missed entirely, and the total purge gas consumption can be loosely estimated at best. There can be times when the leak rate from flare control valves, relief valves that leak process gas, fuel gas, and inert gas into the flare header exceeds the desired purge rate and it is not necessary to add purge gas.

Other current systems avoid ingress into the flare stack, flare knockout drum, and flare network using liquid seal or flame arresters. However, such methods can lead to the possibility of obstruction in the flare stack.

SUMMARY OF THE DISCLOSURE

Embodiments disclosed herein provide system and methods for avoiding excessive flaring and ensuring adequate purging to the flare network system, by monitoring and controlling the fuel gas flow. In current systems, since the purge quantity is not monitored, the applied fuel gas is not optimized. Optimizing the flow of purge gas will minimize excess flaring and purging, limit greenhouse gas emission, and optimize energy and fuel consumption.

In systems and methods disclosed herein, the control of purge gas is possible after remote measuring of the individual and total purge flow rate. The automated control philosophy disclosed herein can optimize the flow and pressure in the flare line to maintain the required positive pressure in the flare network. The wireless flow meters described in this disclosure can be retrofit to replace current analog local meters without need to cut or weld pipes, so that operations at the facility can continue while such replacement operation is being undertaken.

In an embodiment of this disclosure, a method for optimizing purge gas of a flare system includes measuring a flow of flare fluids within a flare system o obtain a measured flow value. The flow of the flare fluids is compared to a target flow to obtain a difference between the flow of the flare fluids and the target flow. A control valve is operated to amend a flow of purge gas and the steps of measuring a flow of flare fluids and comparing the flow of the flare fluids to the target flow are repeated until the flow of the purge gas is within a target range. A value of the flow of purge gas is measured and transmitted wirelessly to a control system.

In certain embodiments the steps of such method are repeated at predetermined intervals. In other embodiments, the steps of such method are performed in real time on demand.

In alternate embodiments, operating the control valve to amend the flow of the purge gas can include operating the control valve remotely with the control system. Before comparing the flow of the flare fluids to the target flow, a value of the flow of the flare fluids can be adjusted based on a temperature and pressure of the flare fluids to arrive at a flow that is commonly known as the compensated flow. Measuring the flow of flare fluids within the flare system can include measuring the flow of flare fluids proximate to a flare header of the flare system or can include measuring the flow of flare fluids at a plurality of locations within the flare system.

In other alternate embodiments, transmitting the measured flow value wirelessly to the control system includes transmitting the measured flow value in accordance with a highway addressable remote transducer protocol. Transmitting the measured flow value wirelessly to the control system can include transmitting the measured flow value by way of an access point. Transmitting the measured flow value wirelessly to the control system can include transmitting the measured flow value wirelessly a distance in a range of 50 m to 600 m between a router and an antenna of an access point. Before measuring the flow of flare fluids within the flare system, an analog flow meter can be replaced with a wireless rotameter in a weldless operation, and measuring the flow of flare fluids within the flare system can include measuring the flow of flare fluids with the wireless rotameter.

In an alternate embodiment of this disclosure, a method for optimizing purge gas of a flare system includes measuring a flow of flare fluids proximate to a flare header of the flare system to obtain a measured flow value. The flow of the flare fluids are compared to a target flow to determine if the flow of flare fluids is within a target flow range. A control valve is operated to open the control valve if the flow of flare fluids is less than the target flow and to close the control valve if the flow of flare fluids is greater than the target flow. The steps of measuring the flow of flare fluids, comparing the flare fluids are to a target flow, and operating the control valve are repeated until the flow of the flare fluids is within the target flow range.

In another alternate embodiment of this disclosure, a system for optimizing purge gas of a flare system includes a sensor system located within the flare system and operable to obtain a measured flow value of a flow of flare fluids within the flare system. A transmitter is operable to transmit the measured flow value to a control system, the control system operable to compare the flow of the flare fluids to a target flow to obtain a difference between the flow of the flare fluids and the target flow. A control valve is positioned to amend a flow of purge gas so that the flow of the flare fluids is within a target range. A wireless flowmeter is positioned to measure a value of the flow of purge gas and transmit the value of the flow of purge gas wirelessly to the control system.

In alternate embodiments, the control valve can be remotely controllable with the control system. The control system can be operable to adjust a value of the flow of the flare fluids based on a temperature and pressure of the flare fluids. The transmitter can be located proximate to a flare header of the flare system.

In other alternate embodiments, additional transmitters can be located at a plurality of spaced apart locations within the flare system. A protocol converter can be operable to transmit the measured flow value wirelessly to the control system in accordance with a highway addressable remote transducer protocol. The control system can include an access point operable to receive the measured flow value wirelessly. A router can be spaced a distance in a range of 50 m to 600 m from an antenna of an access point and the router can be operable to transmit the measured flow value wirelessly to the access point.

BRIEF DESCRIPTION OF THE DRAWINGS

So that the manner in which the above-recited features, aspects and advantages of the embodiments of this disclosure, as well as others that will become apparent, are attained and can be understood in detail, a more particular description of the disclosure briefly summarized above may be had by reference to the embodiments thereof that are illustrated in the drawings that form a part of this specification. It is to be noted, however, that the appended drawings illustrate only preferred embodiments of the disclosure and are, therefore, not to be considered limiting of the disclosure's scope, for the disclosure may admit to other equally effective embodiments.

DETAILED DESCRIPTION

Embodiments of the present disclosure will now be described more fully hereinafter with reference to the accompanying drawings which illustrate embodiments of the disclosure. Systems and methods of this disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art. Like numbers refer to like elements throughout, and the prime notation, if used, indicates similar elements in alternative embodiments or positions.

In the following discussion, numerous specific details are set forth to provide a thorough understanding of the present disclosure. However, it will be obvious to those skilled in the art that embodiments of the present disclosure can be practiced without such specific details. Additionally, for the most part, details concerning well drilling, reservoir testing, well completion and the like have been omitted inasmuch as such details are not considered necessary to obtain a complete understanding of the present disclosure, and are considered to be within the skills of persons skilled in the relevant art.

Figure 1:
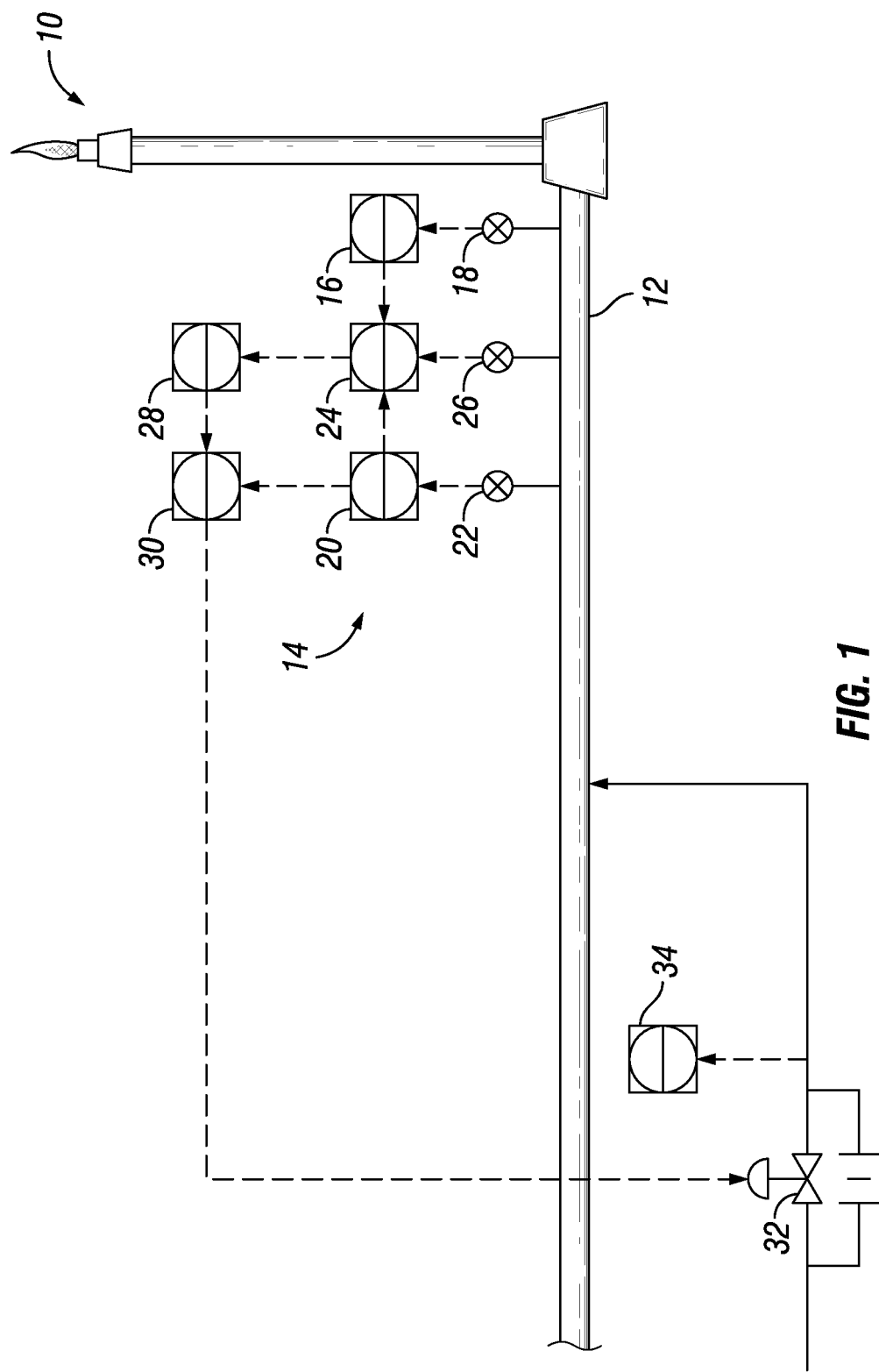
FIG. 1 is a schematic diagram of a system for optimizing purge gas of a flare system, in accordance with an embodiment of this disclosure.

Looking at FIG. 1, a flare system 10 having a flare header 12 is schematically illustrated. In order to determine conditions at flare header 12, a series of sensor systems 14 can measure parameters at flare header 12. Sensor systems 14 can be used for measuring a flow of flare fluids within a flare system to obtain a measured flow value. In the example system of FIG. 1, sensor systems 14 can both sense and transmit parameters at flare header 12. One of the sensor systems 14 can have a temperature indicator 16 and temperature transmitter 18, which together sense and transmit a temperature of a flow of flare fluids through flare system 10. Another of the sensor systems 14 can have pressure indicator 20 and pressure transmitter 22, which together sense and transmit a pressure of a flow of flare fluids through flare system 10.

Another of the sensor systems 14 can have a flow rate detector or relay 24 and a flow rate transmitter 26 for detecting and transmitting a flow rate of a flow of flare fluids through flare system 10. Flow rate detector or relay 24 can also include a conversion or computing function. For example, flow rate detector or relay 24 can adjust or compute a value of the flow of the flare fluids based on a temperature and pressure of the flare fluids that are sensed by other elements of sensor system 14 and provided to flow rate detector or relay 24.

Flow rate detector or relay 24 can communicate the flow rate, temperature and pressure information to a flow indicator and controller 28. Flow indicator and controller 28 can supply such data to a switch 30. Switch 30 can be used to communicate with control valve 32 so that control valve 32 can be operated to amend a flow of purge gas within flare system 10. Control valve 32 can have a restricted orifice across the purge valve to ensure uninterrupted purge flow, in case of stuck closed valve.

Information can be transmitted among elements of sensor systems 14, flow indicator and controller 28, and switch 30 by wireless communication. Such elements can be part of an overall control system 36 (FIG. 2), such as a distributed control system ("DCS"). In alternate embodiments certain information can be transmitted among certain or all of such elements through communication wires. Operating control valve 32 to amend the flow of the purge gas can be performed remotely with control system 36.

In order to determine the appropriate amendment to a flow of purge gas within flare system 10, the flow of the flare fluids can be compared to a target range that includes a target flow to obtain a difference between the flow of the flare fluids and the target flow. The target flow can be a value of flow of flare fluids through the particular region of flare system 10 being evaluated. In the example of FIG. 1, the particular region of flare system 10 being evaluated is a region proximate to flare header 12. In such embodiments the parameters of the flow of flare fluids within the flare system are being measured proximate to flare header 12 of flare system 10. In alternate embodiments, the parameters of the flow of flare fluids within the flare system can be measured at a plurality of locations within flare system 10 to ensure a suitable sweep and distribution of positive pressure throughout flare system 10.

To provide an illustrative example, if the target flow is a flow rate designated as X units, the target range can have an upper limit of X units plus Y % of X and the lower limit of the target range can be X units minus Y % of X. As an example, the target flow rate could be in a range of 0.02 m/s to 0.75 m/s, and in certain embodiments the target flow rate of can be 0.15 m/s. In terms of volumetric flow, the target volumetric flow could be in a range of 0.05 to 1.0 MMSCFD, and in certain embodiments, the target volumetric flow can be 0.38 MMSCFD. The target range can have upper and lower limits of the target flow rate plus and minus 1-10%, and in certain embodiment the target range can have upper and lower limits of the target flow rate plus and minus 10%. This target flow can be the amount of flow required to prevent air ingress into the flare stack and into the vent knockout drum and other regions of the vent network. Such flare fluids can be made up of the total flow to flare header 12 from valve leaks, purge fuel gas, relieved gas, and any other flows of gas. When the flare fluids exceed the target range, the amount of purge gas being delivered can be reduced and when the flare fluids are less than the target range, the amount of purge gas being delivered can be increased. We note that at times, there may be significantly higher amounts of flare fluids traveling to flare header 12. As an example, a high pressure flare can be designed to handle a volume of up to 1,763 MMSCFD with a flow rate of up to 84 m/s.

During a monitoring operation, the flow of the flare fluids can be compared to a target range and the control valve 32 can be operated to amend a flow of purge gas within flare system 10 until the flow of the purge gas is within the target range. During such monitoring operations, as well as during other times, wireless flowmeter 34 can be used to measure a value of the flow of purge gas and transmit the value of the flow of purge gas wirelessly to control system 36. The monitoring and measuring operations can take place at predetermined intervals or can take place in real time on demand, or can take place continuously. Flare system 10 can be a low pressure flare a high pressure flare, or can include both a low pressure flare and a high pressure flare.

Figure 2:
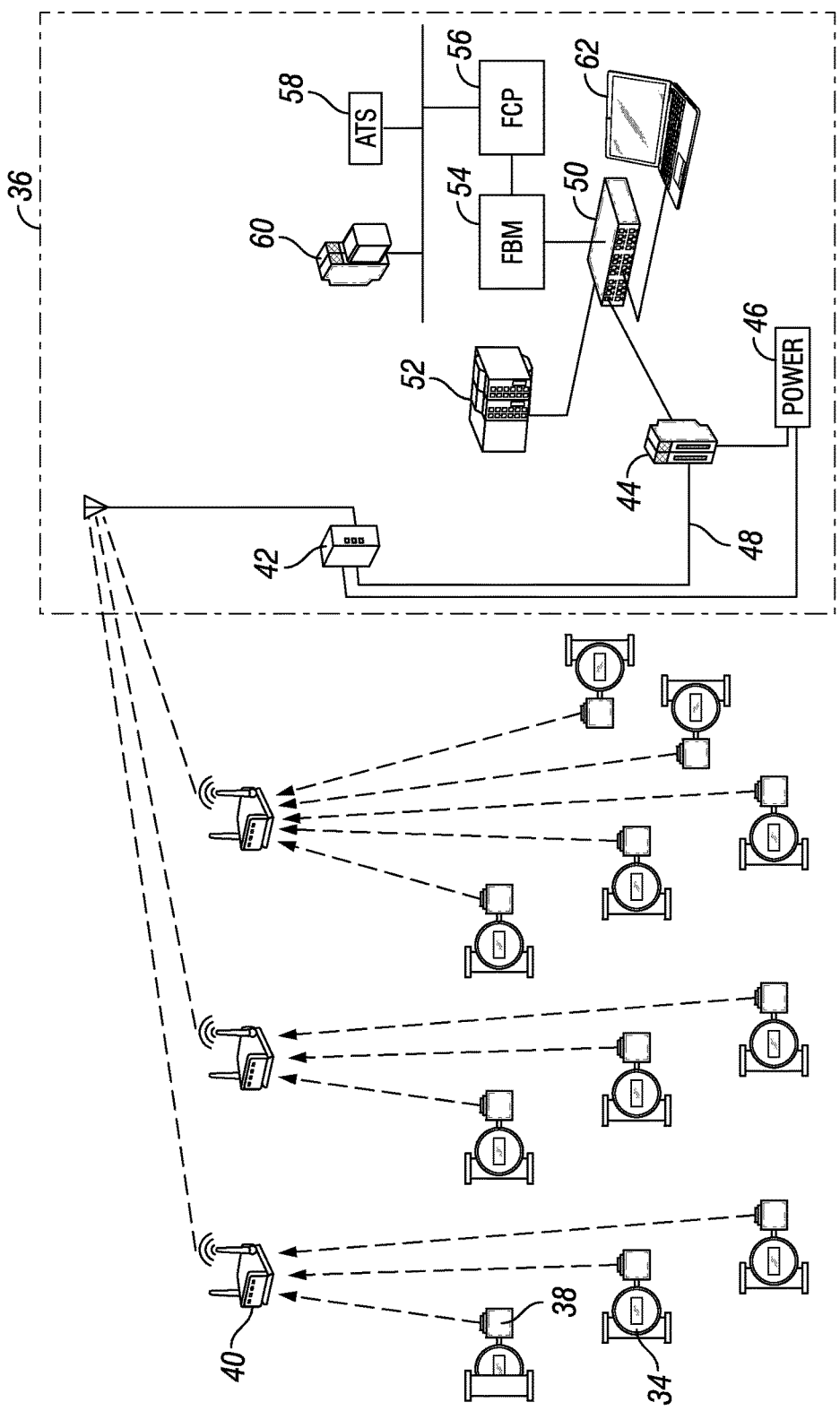
FIG. 2 is a schematic diagram of certain elements of a system optimizing purge gas of a flare system, in accordance with an embodiment of this disclosure.

Looking at FIG. 2, wireless flowmeter 34 can be a wireless rotameter. Wireless flowmeter 34 can be designed to be integrated into current flare systems, replacing current local analog meters. Wireless flowmeter 34 can have the same face to face dimension as current local analog meters so that wireless flowmeter 34 can replace a current analog meters in a hydrocarbon facility in a weldless operation without the need to cut any pipes in order to implement the systems and methods using the wireless flowmeter 34 of embodiments of this application. Wireless flowmeters 34 can also be implemented without having to run new cables throughout the hydrocarbon facility. This will save both time and money compared to using flowmeters with wired communication.

Using the wireless flowmeters 34 of this application will also eliminate the need for expensive DCS input cards and the associated configuration time and costs for all of the flow meters. Wireless flowmeters 34 can be in remote communication with both control system 36 and Plant Information (PI) system. The PI server of the PI system collects the real time data from the DCS and stores the information for years and that can be accessed and used by an operator at a user interface, such as a personal computer, for reviewing trends, performing system analysis, monitoring flare system 10 and troubleshooting any process problems. Integration of wireless flowmeters 34 with control system 36 and the PI system will allow for instant inclusion of the totalized value of the volume of purge gas utilized in a day, week, month, or any other interval to optimize the purging of flare system 10. Integrating wireless flowmeters 34 with control system 36 and the PI system can allow for the totalized value of purge gas to be shown accurately, and such value can be provided in a daily report. Individual measurements obtained by each wireless flowmeter 34, as well as the trends can be provided. Because such reports are provided by remote wireless communication, there is no need for an operator to visit each local flow meter, every shift, to take readings.

Wireless flowmeter 34 can be powered with batteries. However, wireless flowmeter 34 can consume considerable power compared to other wireless devices, Therefore, wireless flowmeter 34 can include an alarm configured to notify the operator in advance for battery replacement.

In the embodiment of FIG. 2, there are a plurality of wireless flowmeters 34 which can be positioned throughout flare system 10. Each wireless flowmeter 34 is associated with a protocol converter 38, such as a highway addressable remote transducer ("HART") protocol converter. Protocol converter 38 can communicate remotely by wireless means with a router 40 so that the measured flow value is transmitted wirelessly to control system 36 in accordance with a highway addressable remote transducer protocol. A number of routers 40 can be spaced around the hydrocarbon facility so that information obtained by each wireless flowmeter 34 can be conveyed to a router 40. Each router 40 can communicate wirelessly with access point 42 in order to transmit the measured flow value to control system 36. In certain embodiments, the measured flow value is transmitted wirelessly a distance in a range of 50 m to 600 m between router 40 and an antenna of access point 42.

Control system 36 can further include Modbus 44 for transmitting information over serial lines between components of control system 36. Both access point 42 and Modbus 44 can be powered by power source 46. Communication cable 48, such as an Ethernet cable, can extend between access point 42 and Modbus 44 for transferring data between access point 42 and Modbus 44. Modbus 44 can be in wired communication with Ethernet switch 50, which in turn is in wired communication with programmable logic controller 52 and field device system integrator module 54.

Field device system integrator module 54 communicates through a communication cable with field control processor 56. Automatic transfer switch 58 and DCS Modbus Client 60 communicate with field control processor 56. Automatic transfer switch 58 can be in communication with other control systems through wireless or wired methods.

User interface 62, such as a laptop computer, desktop computer, tablet, or other type of known user interface can be associated with Ethernet switch 50 so that an operator can access the data provided through control system 36 and can control elements of the flare and purge gas systems. The laptop access from the Ethernet switch 50 can be used for configuring wireless flowmeter 34, such as configuring the device address, Modbus mapping list, baud rate, stop bit and parity bit. The laptop can also be used for setting the alarm for battery healthiness to notify the operator in advance for battery replacement.

Figure 3:
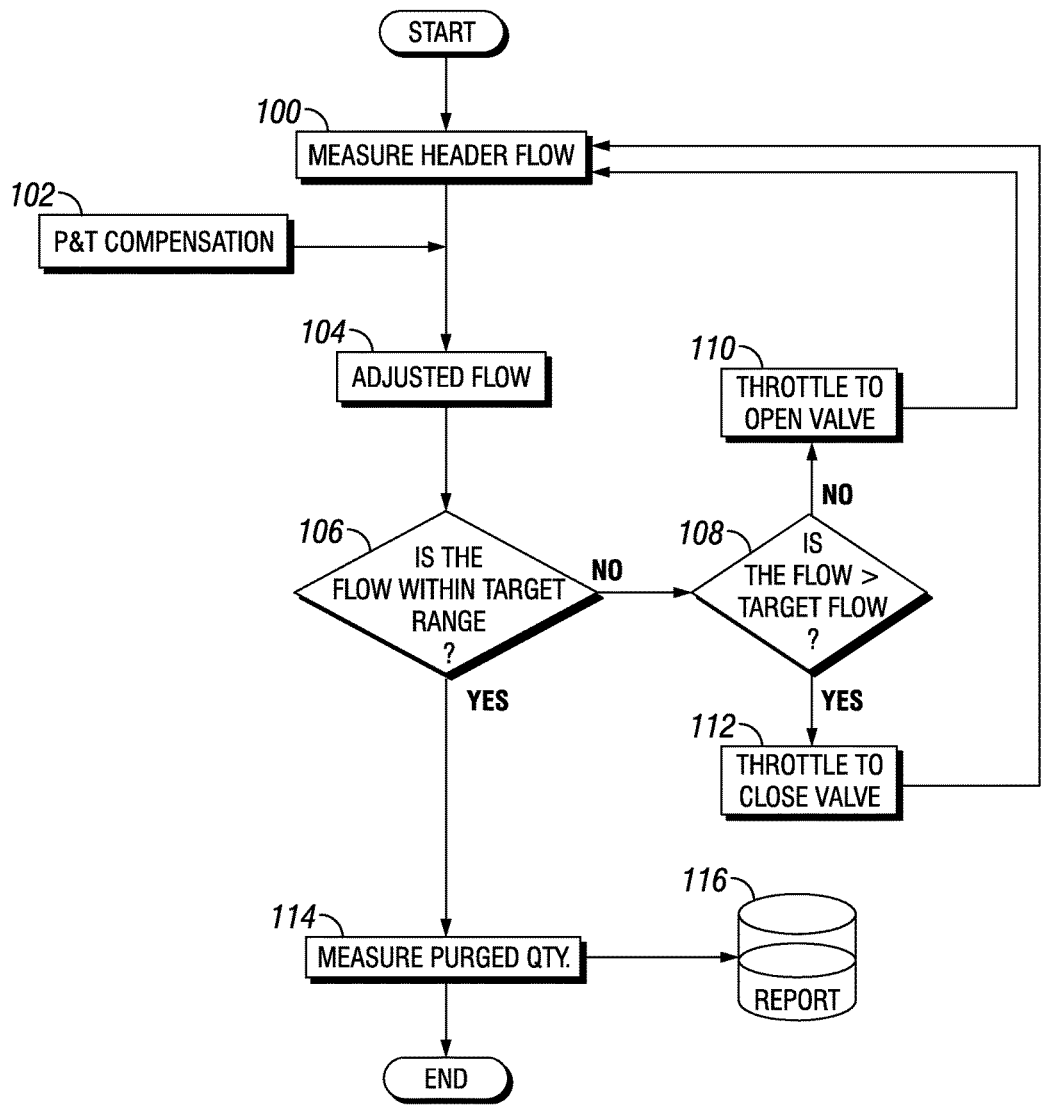
FIG. 3 is a flow diagram of a method for optimizing purge gas of a flare system, in accordance with an embodiment of this disclosure.

Looking at FIG. 3, in an example of operation, in order to optimizing purge gas of flare system 10, an operator can start step 100 by measuring a flow of flare fluids proximate to flare header 12 of the flare system 10 to obtain a measured flow value. Step 100 can be completed utilizing sensor systems 14 as described herein. In step 106, the flow of the flare fluids can be compared to a target flow to determine if the flow of flare fluids is within a target flow range. If the flow of flare fluids is not within the target flow range, then in step 108, the flare fluids can be compared to a target flow to determine if the flow of flare fluids is greater than a target flow.

If the flow of flare fluids is less than a target flow so that the answer in step 108 is no, then in step 110, control valve 32 can be operated to open further to amend the flow of purge gas within flare system 10 and increase the flow of purge gas within flare system 10. After increasing the flow of purge gas within flare system 10, the prior steps can be repeated, starting again at step 100 by measuring a flow of flare fluids proximate to flare header 12 of the flare system 10 to obtain a measured flow value.

If the flow of flare fluids is greater than a target flow so that the answer in step 108 is yes, then in step 112, control valve 32 can be operated to close further to amend the flow of purge gas within flare system 10 and decrease the flow of purge gas within flare system 10. After decreasing the flow of purge gas within flare system 10, the prior steps can be repeated, starting again at step 100 by measuring a flow of flare fluids proximate to flare header 12 of the flare system 10 to obtain a measured flow value.

Such steps can be repeated until in step 106, when the flow of the flare fluids is compared to the target flow and it is determined that the flow of flare fluids is within the target flow range. In such case, in step 114, wireless flowmeter 34 can be used to measure a value of the flow of purge gas and transmit the value of the flow of purge gas wirelessly to control system 36. In step 116, the value of the flow of purge gas can be saved, displayed, and otherwise reported to the operator.

In certain embodiments, before the flow of the flare fluids is compared to a target flow to determine if the flow of flare fluids is within a target flow range in step 106, the value of the flow of the flare fluids can first be adjusted based on a temperature and pressure of the flare fluids to arrive at an adjusted flow value, commonly known as the compensated flow. The temperature and pressure values used to adjust the flow of flare fluids can be obtained utilizing sensor systems 14 as described herein. In gas flow measurements, the density of the gas changes as pressure and temperature change. This change in density can affect the accuracy of the measured flow rate if it is uncompensated.

Embodiments of the disclosure described herein, therefore, are well adapted to carry out the objects and attain the ends and advantages mentioned, as well as others inherent therein. While a presently preferred embodiment of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for optimizing purge gas of a flare system, the method comprising:
 (a) measuring a volumetric flow rate of flare fluids within the flare system to obtain a measured volumetric flow rate value;
 (b) comparing the volumetric flow rate of the flare fluids to a target volumetric flow rate to obtain a difference between the volumetric flow rate of the flare fluids and the target volumetric flow rate;
 (c) operating a control valve to amend a volumetric flow rate of purge gas;
 (d) repeating steps (a)-(c) until the volumetric flow rate of the purge gas is within a target range; and
 (e) measuring a value of the volumetric flow rate of purge gas with a wireless rotameter and transmitting the value of the volumetric flow rate of purge gas wirelessly to a control system with the wireless rotameter.

2. The method of claim 1, wherein operating the control valve to amend the volumetric flow rate of the purge gas includes operating the control valve remotely with the control system.

3. The method of claim 1, further including before comparing the volumetric flow rate of the flare fluids to the target volumetric flow rate, adjusting a value of the volumetric flow rate of the flare fluids based on a temperature and pressure of the flare fluids.

4. The method of claim 1, wherein measuring the volumetric flow rate of flare fluids within the flare system includes measuring the volumetric flow rate of flare fluids at a flare header of the flare system.

5. The method of claim 1, wherein measuring the volumetric flow rate of flare fluids within the flare system includes measuring the volumetric flow rate of flare fluids at a plurality of locations within the flare system.

6. The method of claim 1, wherein transmitting the measured volumetric flow rate value wirelessly to the control system includes transmitting the measured volumetric flow rate value in accordance with a highway addressable remote transducer protocol.

7. The method of claim 1, further comprising repeating steps (a)-(e) at predetermined intervals.

8. The method of claim 1, further comprising performing steps (a)-(e) in real time on demand.

9. The method of claim 1, wherein transmitting the measured volumetric flow rate value wirelessly to the control system includes transmitting the measured volumetric flow rate value by way of an access point.

10. The method of claim 1, wherein transmitting the measured volumetric flow rate value wirelessly to the control system includes transmitting the measured volumetric flow rate value wirelessly a distance in a range of 50 m to 600 m between a router and an antenna of an access point.

11. The method of claim 1, further including before measuring the volumetric flow rate of flare fluids within the flare system by adding the wireless rotameter to the flare system, where the wireless rotameter has face to face dimensions to allow for the addition of the wireless rotameter to the flare system between end faces of the flare system in a weldless operation.

12. A method for optimizing purge gas of a flare system, the method comprising:
- (a) measuring a volumetric flow rate of flare fluids at a flare header of the flare system with a wireless flow rate detector to obtain a measured volumetric flow rate value;
- (b) comparing the volumetric flow rate of the flare fluids to a target flow rate to determine if the volumetric flow rate of flare fluids is within a target volumetric flow rate range;
- (c) operating a control valve of a purge gas to open the control valve if the volumetric flow rate of flare fluids is less than the target volumetric flow rate and to close the control valve if the volumetric flow rate of flare fluids is greater than the target volumetric flow rate; and
- (d) repeating steps (a)-(c) until the volumetric flow rate of the flare fluids is within the target volumetric flow rate range.

13. A system for optimizing purge gas of a flare system, the system comprising:
- a sensor system located within the flare system and operable to obtain a measured volumetric flow rate value of a volumetric flow rate of flare fluids within the flare system;
- a transmitter operable to transmit the measured volumetric flow rate value to a control system, the control system operable to compare the volumetric flow rate of the flare fluids to a target volumetric flow rate to obtain a difference between the volumetric flow rate of the flare fluids and the target volumetric flow rate;
- a control valve positioned to amend a volumetric flow rate of purge gas so that the volumetric flow rate of the flare fluids is within a target range; and
- a wireless flowmeter positioned to measure a value of the volumetric flow rate of purge gas and transmit the value of the volumetric flow rate of purge gas wirelessly to the control system.

14. The system of claim 13, wherein the control valve is remotely controllable with the control system.

15. The system of claim 13, wherein the control system is operable to adjust a value of the volumetric flow rate of the flare fluids based on a temperature and pressure of the flare fluids.

16. The system of claim 13, wherein the transmitter is located at a flare header of the flare system.

17. The system of claim 13, further comprising additional transmitters, the additional transmitters being located at a plurality of spaced apart locations within the flare system.

18. The system of claim 13, further comprising a protocol converter operable to transmit the measured volumetric flow rate value wirelessly to the control system in accordance with a highway addressable remote transducer protocol.

19. The system of claim 13, wherein the control system further includes an access point operable to receive the measured volumetric flow rate value wirelessly.

20. The system of claim 13, further comprising a router spaced a distance in a range of 50 m to 600 m from an antenna of an access point, the router operable to transmit the measured volumetric flow rate value wirelessly to the access point.

* * * * *